US011977657B1

(12) United States Patent
Calafato et al.

(10) Patent No.: US 11,977,657 B1
(45) Date of Patent: May 7, 2024

(54) METHOD AND SYSTEM FOR CONFIDENTIAL REPOSITORY SEARCHING AND RETRIEVAL

(71) Applicant: LORICA CYBERSECURITY INC., Toronto (CA)

(72) Inventors: Joshua Calafato, Toronto (CA); Shariq Khalil Ahmed, Mississauga (CA); Yousef Sadrossadat, North York (CA); Yeqi Shi, Toronto (CA); Alhassan Khedr, Toronto (CA); Glenn Gulak, Etobicoke (CA)

( * ) Notice: Subject to any disclaimer, the term of this patent is extended or adjusted under 35 U.S.C. 154(b) by 0 days.

(21) Appl. No.: 18/172,998

(22) Filed: Feb. 22, 2023

(51) Int. Cl.
*G06F 21/62* (2013.01)
*G06F 21/60* (2013.01)

(52) U.S. Cl.
CPC ........ *G06F 21/6227* (2013.01); *G06F 21/602* (2013.01)

(58) Field of Classification Search
CPC ............................ G06F 21/6227; G06F 21/602
See application file for complete search history.

(56) References Cited

U.S. PATENT DOCUMENTS

| | | | | |
|---|---|---|---|---|
| 9,171,173 B1* | 10/2015 | Rogers | ..................... | G06F 21/76 |
| 10,075,288 B1* | 9/2018 | Khedr | ..................... | H04L 9/008 |
| 2013/0173917 A1* | 7/2013 | Clifton | .................. | G06F 16/334 |
| | | | | 713/167 |
| 2016/0132692 A1* | 5/2016 | Kerschbaum | ....... | G06F 21/6227 |
| | | | | 713/189 |
| 2017/0300713 A1* | 10/2017 | Fan | ..................... | H04L 63/0435 |
| 2017/0323118 A1* | 11/2017 | Fink | ..................... | G06F 21/6245 |
| 2019/0034646 A1* | 1/2019 | Fujiwara | ................. | H04L 9/008 |
| 2020/0007514 A1* | 1/2020 | Li | .......................... | G06F 21/602 |
| 2020/0145389 A1* | 5/2020 | Shawe-Taylor | ....... | H04L 63/062 |
| 2020/0151356 A1* | 5/2020 | Rohloff | .............. | G06F 21/6227 |
| 2020/0403781 A1* | 12/2020 | Gentry | .................... | H04L 9/008 |
| 2021/0191925 A1* | 6/2021 | Sianez | .................. | G06N 20/00 |
| 2021/0192076 A1* | 6/2021 | Patel | ........................ | G06F 17/16 |
| 2021/0336770 A1* | 10/2021 | Ahmed | ................. | H04L 9/0643 |
| 2022/0140996 A1* | 5/2022 | Cebere | .................... | H04L 9/008 |
| | | | | 713/159 |
| 2022/0198048 A1* | 6/2022 | Sehrawat | ................ | H04L 9/085 |

OTHER PUBLICATIONS

Angel, Sebastian, et al., "PIR with compressed queries and amortized query processing", (2017). International Association for Cryptologic Research. https://eprint.iacr.org/2017/1142.pdf.

* cited by examiner

*Primary Examiner* — Meng Li
(74) *Attorney, Agent, or Firm* — Bhole IP Law; Anil Bhole; Marc Lampert

(57) ABSTRACT

Provided is a system and method for confidential repository searching. The method executed on a first computing device and includes: receiving an encrypted query term from the second computing device; searching the encrypted data repository by determining one or more matches of the encrypted query term to data in the encrypted data repository; communicating the one or more matches to the second computing device; receiving associative data from the second computing device, the associative data associated with data in the encrypted data repository that is to be retrieved and associated with one of the one or more matches; retrieving the encrypted data in the encrypted data repository associated with the received associative data; and communicating the retrieved encrypted data to the second computing device.

19 Claims, 10 Drawing Sheets

METHOD AND SYSTEM FOR CONFIDENTIAL REPOSITORY SEARCHING AND RETRIEVAL

TECHNICAL FIELD

The following relates generally to data processing, and more specifically, to a method and system for confidential repository searching and retrieval.

BACKGROUND

Searching an unencrypted data repository is a common data processing problem. A data repository may typically be encrypted to keep data contents confidential. However, encrypting data contents prevents an inquirer from searching through data contents in their encrypted form. As a result, general approaches to data repository architecture, do not provide any means to make a data repository simultaneously confidential and searchable. Generally, searching through encrypted data contents would require an inquirer to download the encrypted data of a repository to a trusted environment to decrypt the repository and then perform a search with the objective of identifying the files or document that is specified by the search terms.

SUMMARY

In an aspect, there is provided a method for confidential repository searching, the method executed on at least one processing unit of a first computing device, the first computing device having received an encrypted data repository from a second computing device, the method comprising: receiving an encrypted query term from the second computing device; searching the encrypted data repository by determining one or more matches of the encrypted query term to data in the encrypted data repository; communicating the one or more matches to the second computing device; receiving associative data from the second computing device, the associative data associated with encrypted data in the encrypted data repository that is to be retrieved and associated with one of the one or more matches; retrieving the encrypted data in the encrypted data repository associated with the received associative data; and communicating the retrieved encrypted data to the second computing device.

In a particular case of the method, retrieving the encrypted data in the encrypted data repository associated with the received associative data comprises using private information retrieval (PIR).

In another case of the method, searching the encrypted data repository comprises performing subtraction searching.

In yet another case of the method, the second computing device hashes and partitions the query term to generate hash partition polynomials, wherein each one of the polynomials is encrypted to form a homomorphically encrypted ciphertext, and wherein the homomorphically encrypted ciphertext comprises the encrypted query term.

In yet another case of the method, searching the encrypted data repository comprises subtracting each partitioned query ciphertext from polynomials in a corresponding column of the encrypted data repository, and wherein a subtraction result of 0 indicates a match.

In yet another case of the method, for each row of the encrypted data repository, the subtraction results of each hash partition ciphertexts for the same row are added together.

In yet another case of the method, each element in the encrypted data repository has been hashed using a predetermined hash function, and wherein, for each column in the data repository, an array of packed polynomials is created where each coefficient of each polynomial encodes a single hashed element in each column.

In yet another case of the method, each polynomial in the encrypted data repository encodes only one partition of rows that such polynomial includes.

In yet another case of the method, searching the encrypted data repository comprises searching only in a column of polynomials of the search database associated with the encrypted query term.

In yet another case of the method, the associative data comprises an index that is encoded using an encrypted polynomial where the index, i, is encoded by making an i-th coefficient 1, and all other coefficients 0.

In yet another case of the method, the associative data comprises an index that is encoded using multiple encrypted polynomials, the number of encrypted polynomials equal to a number of terms in the encrypted data repository, and wherein the i-th polynomial encodes a 1 and other polynomials encode a 0.

In yet another case of the method, searching the encrypted data repository comprises performing Labeled Private Set Intersection searching or Bit Decompose searching.

In another aspect, there is provided a system for confidential repository searching, the system comprises at least one processing unit and a data storage media in communication with the at least one processing unit, the at least one processing unit and the data storage media part of a first computing device, the first computing device having received an encrypted data repository from a second computing device, the at least one processing unit configured to execute: an interface module to receive an encrypted query term from the second computing device; an evaluation module to search the encrypted data repository by determining one or more matches of the encrypted query term to data in the encrypted data repository, wherein the interface module communicates the one or more matches to the second computing device and receives associative data from the second computing device, the associative data associated with encrypted data in the encrypted data repository that is to be retrieved and associated with one of the one or more matches; and a data module to retrieve the encrypted data in the encrypted data repository associated with the received associative data, wherein the interface module communicates the retrieved encrypted data to the second computing device.

In a particular case of the system, retrieving the encrypted data in the encrypted data repository associated with the received associative data comprises using private information retrieval (PIR).

In another case of the system, searching the encrypted data repository comprises performing subtraction searching.

In yet another case of the system, the second computing device hashes and partitions the query term to generate hash partition polynomials, wherein each one of the polynomials is encrypted to form a homomorphically encrypted ciphertext, and wherein the homomorphically encrypted ciphertext comprises the encrypted query term.

In yet another case of the system, searching the encrypted data repository comprises subtracting each partitioned query ciphertext from polynomials in a corresponding column of the encrypted data repository, and wherein a subtraction result of 0 indicates a match.

In yet another case of the system, for each row of the encrypted data repository, the subtraction results of each hash partition ciphertexts for the same row are added together.

In yet another case of the system, each element in the encrypted data repository has been hashed using a predetermined hash function, and wherein, for each column in the data repository, an array of packed polynomials is created where each coefficient of each polynomial encodes a single hashed element in each column.

In yet another case of the system, each polynomial in the encrypted data repository encodes only one partition of rows that such polynomial includes.

In yet another case of the system, searching the encrypted data repository comprises searching only in a column of polynomials of the search database associated with the encrypted query term.

In yet another case of the system, the associative data comprises an index that is encoded using an encrypted polynomial where the index, i, is encoded by making an i-th coefficient 1, and all other coefficients 0.

In yet another case of the system, the associative data comprises an index that is encoded using multiple encrypted polynomials, the number of encrypted polynomials equal to a number of terms in the encrypted data repository, and wherein the i-th polynomial encodes a 1 and other polynomials encode a 0.

In yet another case of the system, searching the encrypted data repository comprises performing Labeled Private Set Intersection searching or Bit Decompose searching.

In another aspect, there is provided a method for confidential repository searching, the method executed on at least one processing unit of a second computing device, the first computing device having communicated an encrypted data repository to a first computing device; the method comprising: receiving a query term to be searched on the encrypted data repository; encrypting the query term; communicating the encrypted query term to the first computing device to be searched against the encrypted data repository by determining one or more matches of the encrypted query term to data in the encrypted data repository; receiving the one or more matches to the second computing device; decrypting the one or more matches; receiving associative data associated with the one of the one or matches that is to be retrieved from the encrypted data repository; encrypting the associative data; communicating the encrypted associative data to the second computing device, the encrypted data in the encrypted data repository is retrievable with the received encrypted associative data; receiving the retrieved encrypted data from the second computing device; decrypting the retrieved encrypted data; and outputting the decrypted retrieved data.

BRIEF DESCRIPTION OF THE DRAWINGS

The features of the invention will become more apparent in the following detailed description in which reference is made to the appended drawings wherein.

DETAILED DESCRIPTION

Figure 1:
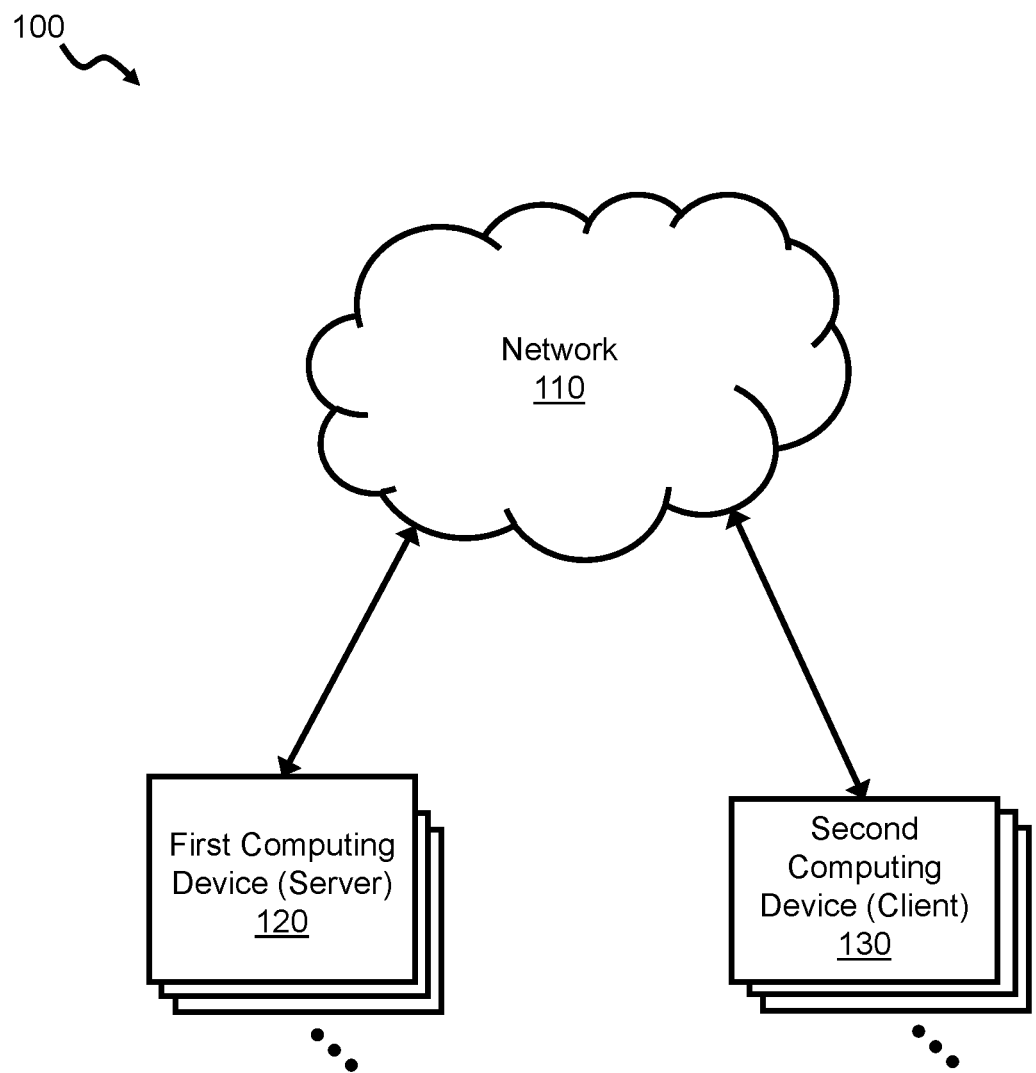
FIG. 1 is a schematic diagram of a system for confidential repository searching, in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein. It is appreciated that at least some of the order and necessity of the steps and limitations of the methods can be varied or changed as appropriate, while retaining the technical contributions of the methods.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer-readable media such as storage media, computer storage media, or data storage devices (removable and/or non-removable) such as, for example, solid-state drives, magnetic disks, optical disks, or tape. Computer storage media may include volatile and non-volatile, removable and non-removable media implemented in any method or technology for storage of information, such as computer-readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or emerging molecular information storage technology, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor, as a plurality of processors, as a multi-core and/or multi-threaded processors, or the like. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to data processing, and more specifically, to a method and system for confidential repository searching. In the present embodiments, confidential data repository searching advantageously makes it possible to maintain confidentiality of search inquiries, and confidentiality of results of the searches, without requiring decrypting of the contents of the searched data repositories in an execution environment.

In the following disclosure, the following notation will be referred to:
- N: max number of rows in a database;
- n: polynomial degree;
- q: ciphertext modulus bit width;
- t: plaintext modulus bit width;
- |t|: number of bits that fit in the plaintext modulus, $|t|=\log_2(t) |t|=\log 2(t)$;
- H: hash function; and
- |H|: number of bits that the hash function produces.

Confidential repository searching provides an approach to confidentially search through secure (e.g., quantum-resistant a.k.a. quantum-secure) encrypted data contents while such data is stored in an encrypted form in a data repository. Confidential searching in the context of the present embodiments generally refers to searching without compromising the confidentiality of the data such that the search operation can be performed without decrypting the encrypted data. In some cases, results of the confidential searching operation can also be, or remain, encrypted.

The present embodiments generally refer to quantum-resistant, sometimes referred to as quantum-secure encryption; which is able to maintain confidentiality of the encryption against a cryptanalytic attack generally executed using a quantum computer. However, the present embodiments can be used with any suitable encryption regime.

Advantageously, the confidential searching operation of the present embodiments does not require a trusted environment to perform the search operation and can be performed in an untrusted environment. Once the confidential searching operation is executed, encrypted results can be communicated to the inquirer computing device that can decrypt the results in a trusted environment; using a decryption key that is associated with encryption key that was initially used to encrypt the data contents. In some cases, the decryption key and the encryption key can be identical in the case of symmetric encryption, or different in the case of asymmetric encryption. Advantageously, throughout the confidential searching operation, the decrypted results of the operation can remain available only to the inquirer having the encryption key, generally maintaining the confidentiality of the encrypted data, the search operation, and the search results.

In some cases, the confidential searching operation of the present embodiments can make use of Homomorphic Encryption (HE) schemes. Generally, homomorphic encryption schemes allow for basic arithmetic operations to be directly performed on encrypted data without decrypting the data or compromising the confidentiality. String searches under an HE schema are typically several magnitudes slower than simple search on unencrypted data.

In some cases, conventional search operations can be performed using a naive approach directly performed on data contents in a data repository; however, since a naive approach requires scanning the entire data content, it can become unnecessarily slow and inefficient. A common solution to speed up a search operation is to use indexed searching, which relies on pre-processed indices of data. In an indexed search approach, one or more indices are searched instead of the data content itself. An index is usually generated once the data is received in a repository. Updates to the index can be applied, for example, either infrequently or following every change in data contents. Data indices are structured and sorted to make a search operation generally faster than a similar search operation on the main data content itself. Additionally, the total size of indices is generally smaller than the indexed data content.

The present inventors recognized that the benefits of indexed searching, e.g., (1) smaller data size and (2) faster search operation, makes data indexing suitable for encrypted searching under an HE schema. Compared to similar search operations directly performed on the encrypted data repository itself, because in an HE environment the size of an index is smaller, the undesirable effects of data expansion and slower search execution time are substantially smaller.

In some approaches, confidential searching using HE can use Labeled Private Set Intersection (Labelled PSI). A Private Set Intersection (PSI) problem involves two parties, each owning a private set of data content. While one party (the Receiver) only learns of an intersection between the two private sets, the other party (the Sender) learns nothing. In a Labelled PSI search using HE, element comparisons can be transformed into arithmetic circuits that can be evaluated with HE operations. Optimizations for efficient mapping and comparison of the sets in HE-compatible structures are also possible in a Labelled PSI search. Labelled PSI is generally efficient when operating on well-defined sets, such as indices. It is also generally efficient in communication and can be used to retrieve a matched record, such as the indexed location of a matched search result. However, the fact that Labelled PSI operates on sets is a substantial limitation because, for a structured database, in order to use labelled PSI, the database has to be mapped to a set. This mapping can be very complex and complicated. Even though labelled PSI can be efficient, the substantial complications arising from mapping of a database to operable sets makes labelled PSI very inefficient for certain databases; such as a database of metadata tags and multi-parameter indices in a data repository Other approaches to searching using an HE scheme are by using a subtraction search. Subtraction search is generally computationally efficient. It can be used to retrieve the location of matches and to compress the results of a logical AND query. However, subtraction search, using an HE scheme, is generally inefficient when communicating the results because the results of each query are comparable in size to that of the searched database. Additionally, subtraction search can generally not be used to retrieve matched records.

Further approaches to searching are using private information retrieval (PIR). Using PIR, a client device can retrieve an element from a database managed by one or more untrusted servers without allowing the server or providing it with any means to learn which element was retrieved. Two improved variants of PIR are information-theoretic PIR (ITPIR) and computational PIR (CPIR). ITPIR generally relies on replicating a database across several non-colluding servers instead of using cryptographic operations. In ITPIR, the client device makes a query to several servers and combines the responses after receiving them from the servers. ITPIR is generally computationally efficient, however, it is substantially difficult to implement because of the difficulty in ensuring that the servers remain non-colluding. CPIR on the other hand relies on a cryptographically encrypted database and operations; however, CPIR imposes an undesirable computational overhead.

In embodiments of the present invention, a confidential searching operation can include metadata associated with data content and/or the data contents themselves (e.g. keywords). Metadata can be encrypted using any suitable encryption scheme, for example, a homomorphic encryption scheme; while the original data content can be encrypted using any suitable encryption scheme, for example, HE or a quantum-resistant symmetric block cipher like AES-256. The data content can then be stored in the repository database. An inquirer device can then search the encrypted metadata using encrypted queries (e.g., HE-encrypted indices using HE-encrypted queries). In some cases, by examining the results of the search operation, the inquirer device can make a determination to retrieve and/or decrypt only the relevant original data contents instead of the entire data repository.

Advantageously, the confidential repository searching operation of the present embodiments is able to maintain confidentiality of data contents, the search inquiry, and the search result. Additionally, the operation advantageously does not depend on trusting an execution environment or an execution host for performing the search operation. The encrypted index can be confidentially searched while the search inquiry, the search results, and the encrypted index itself can remain encrypted in an untrusted execution environment.

In many cases, the computing system that hosts the search will not be exposed to the results of the search. After the confidential searching operation is performed, the results can be provided to the inquirer device, whereby such inquirer device will only be able to view the search results if such device has a decryption key to the encrypted index stored thereon. Advantageously, the decryption key does not need to be shared with the search execution environment or the quantum-safe data repository.

The results of a search received by the inquirer device can be used to retrieve information about the encrypted content. The results can also be used to retrieve a portion of the data content that is of interest instead of the entire data repository. This allows the confidential searching operations of the present embodiments to be performed on quantum-safe encrypted data storages (such as any cold data storage or infrequently accessed data storage), as well as on frequently accessed data storages (such as cloud-based data storages). In many cases, air gapped storage systems, such as tape or molecular information storage systems (such as DNA data storage), offer an additional level of security to the encrypted database that may be desirable in some environments. In many cases, HE encrypted associative data available over the network 110 allows for efficient search and physical retrieval of the data files on the cold storage; which can offer an additional step of security for ultra-secure cold data storage systems.

Advantageously, embodiments of the present disclosure provide confidential repository searching using HE; for example, using the subtraction search and the computational variant of PIR to perform the confidential repository searching. In some cases, an encrypted search database can be generated and maintained along with the data contents of the repository, such as once data contents have been added to, or updated, in the repository. The encrypted search database can include associative data related to the data contents; the associative data can include, for example, metadata attributes associated with the data contents in the repository, elements extracted from the data contents in the repository (which are commonly referred to as 'keywords'), indices referring to locations of specific data contents in the repository, indices referring to locations of metadata attributes, or the like. Associated updates can be applied to the encrypted search database following changes in the data contents of the data repository. In a particular embodiment, the confidential repository search can be performed by determining matching associative data (e.g., matching metadata attributes or matching indices) for a query using subtraction search and then retrieving the records in the repository, based on the associative data, using CPIR. In some cases, the metadata and/or keywords can be represented numerical, or classified into classes or categories.

Referring to FIG. 1, a system 100 for confidential repository searching, in accordance with an embodiment, is shown. In this embodiment, the system 100 includes one or more first computing devices 120 (which can be referred to as a 'server' or a 'host') and one or more second computing devices 130 (which can be referred to as a 'client' or an 'inquirer') communicating over a network 110 (for example, a local area network or the Internet). The computing devices 120 and 130 can be any suitable device; for example, a desktop computer, a laptop computer, a smartphone, a tablet computer, a mobile device, a smartwatch, a microprocessor, dedicated hardware, or the like. In further embodiments, aspects or functions of the system 100 can be run on further computing devices, such as a separate server. In some embodiments, the components of the first computing device 120 and the second computing device 130 are each stored by and executed on a single computer system. In other embodiments, the components of the first computing device 120 and the second computing device 130 are each distributed among two or more computer systems that may be locally or remotely distributed. With distribution of the components of the first computing device 120 among two or more computer systems, the confidential repository searching can be performed on large distributed dataset, such as for data pools or data lakes.

Figure 2:
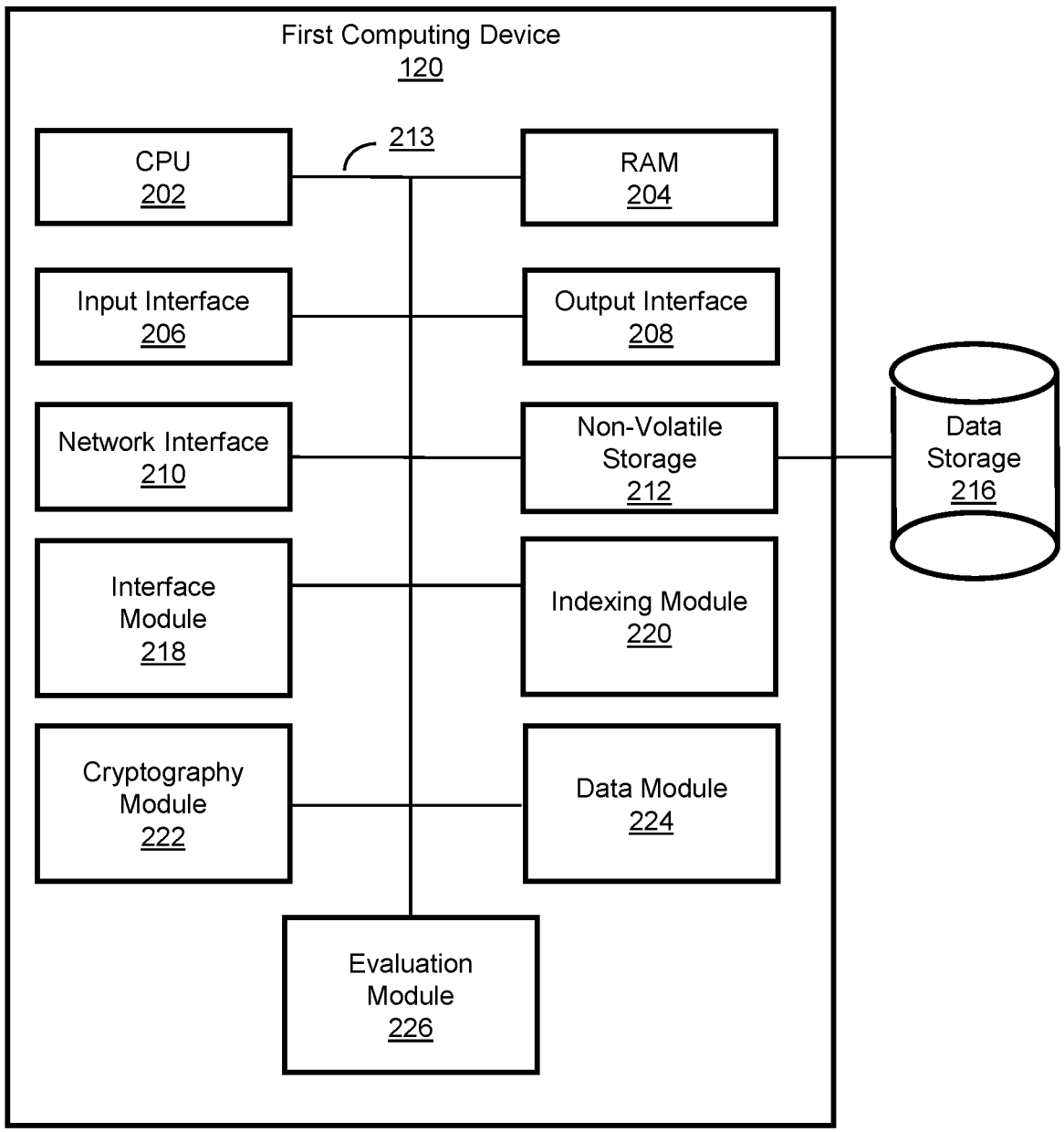
FIG. 2 is a schematic diagram showing an example embodiment of a first computing device of the system of FIG. 1.

FIG. 2 shows an example embodiment of the first computing device 120 including various physical and logical components. As shown, the first computing device 120, in this example, has a number of physical and logical components, including a central processing unit ("CPU") 202 (comprising one or more processors), random access memory ("RAM") 204, an input interface 206, an output interface 208, a network interface 210, non-volatile storage 212, and a local bus 213 enabling CPU 202 to communicate with the other components. CPU 202 executes an operating system, and various modules, as described below in greater detail. RAM 204 provides relatively responsive volatile storage to CPU 202. The input interface 206 enables an administrator or user to provide input via an input device, for example a keyboard and mouse. The output interface 208 outputs information to output devices, such as a display and/or speakers. The network interface 210 permits communication with other systems, such as the second computing device 130 over the network 110, or other computing devices and servers remotely located from the system 100, such as for a typical cloud-based access model. Non-volatile storage 212 stores the operating system and programs, including computer-executable instructions for implementing the operating system and modules, as well as any data used by these services. Additional stored data, as described below, can be stored in a data storage 216. During operation of the system 100, the operating system, the executable modules, and the related data may be retrieved from the non-volatile storage 212 or data storage 216 and placed in RAM 204 to facilitate execution.

In an embodiment, the first computing device 120 further includes a number of executable conceptual modules, including an interface module 218, an indexing module 220, a cryptography module 222, a data module 224, and an evaluation module 226. In some cases, the modules 218, 220, 222, 224, and 226 can be executed on the CPU 202. In further cases, some of the functions of the modules 218, 220, 222, 224, and 226 can be executed on a server, on cloud computing resources, or other devices. In some cases, some or all of the functions of any of the modules 218, 220, 222, 224, and 226 can be combined or run on other modules.

In some cases, for example where the encryption key and decryption keys are not identical, a confidential searching operation can include multiple second computing devices 130; for example, one or more data owners and/or one or more data inquirers. One or more data owners can use one or more encryption keys to create a confidential data repository. While data inquirers can use one or more decryption keys, which are associated with the encryption keys that are initially used to encrypt the data contents, to decrypt the results of each inquiry. Advantageously, having multiple data owners and/or multiple data inquiries can make it possible to have several clients for a shared confidential repository while each client can have a different access privilege, for example, a data owner or a trusted data inquirer.

Figure 3:
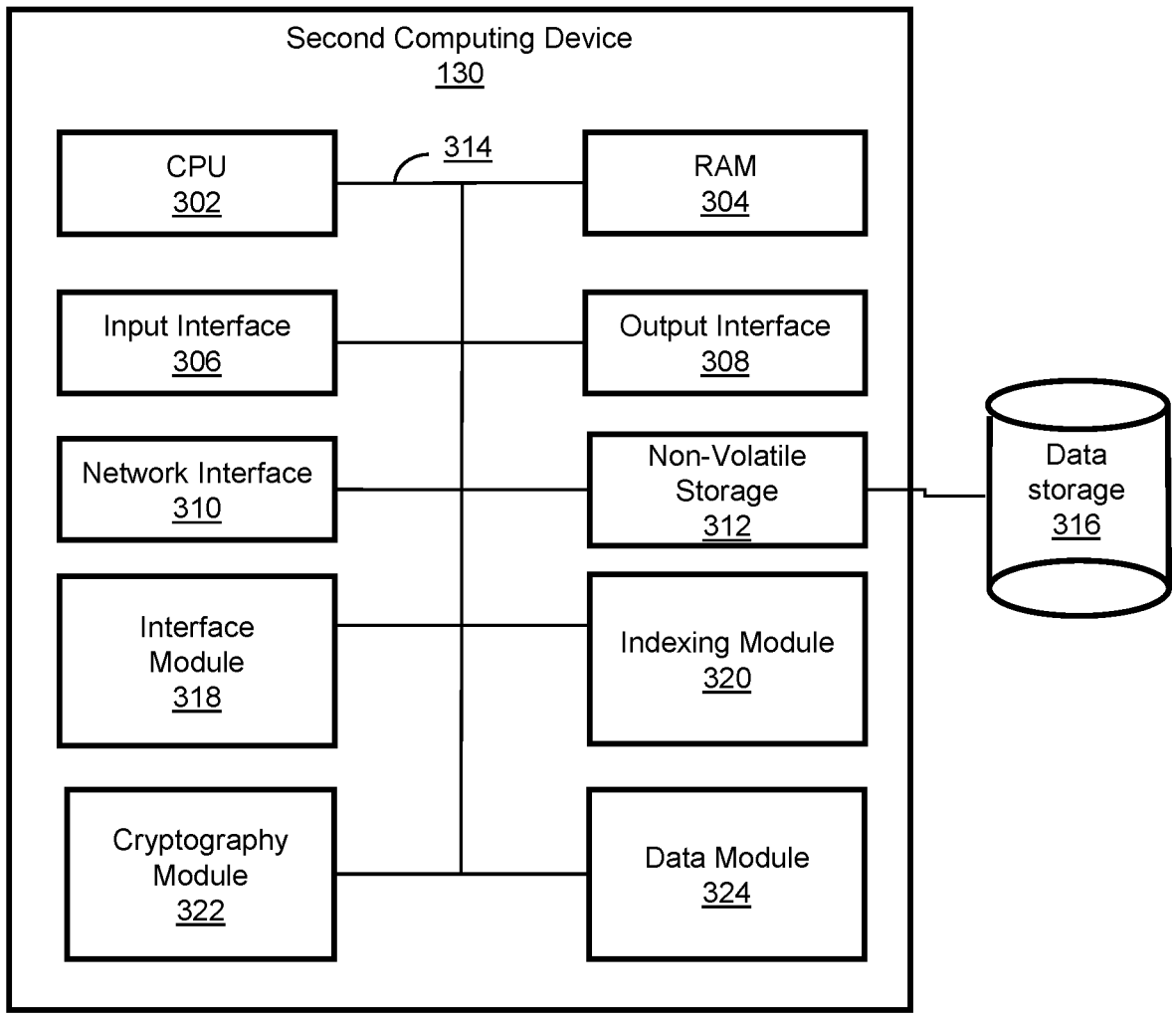
FIG. 3 is a schematic diagram showing an example embodiment of a second computing device of the system of FIG. 1.

FIG. 3 shows an example embodiment of the second computing device 130 including various physical and logical components. As shown, the second computing device 130, in this example, has a number of physical and logical components, including a central processing unit ("CPU") 302 (comprising one or more processors), random access memory ("RAM") 304, an input interface 306, an output interface 308, a network interface 310, non-volatile storage 312, and a local bus 314 enabling CPU 302 to communicate with the other components. CPU 302 executes an operating system, and various modules, as described below in greater detail. RAM 304 provides relatively responsive volatile storage to CPU 302. The input interface 306 enables an administrator or user to provide input via an input device, for example a keyboard and mouse. The output interface 308 outputs information to output devices, such as a display and/or speakers. The network interface 310 permits communication with other systems, such as the first computing device 120 over the network 110, or other computing devices and servers remotely located from the system 100, such as for a typical cloud-based access model. Non-volatile storage 312 stores the operating system and programs, including computer-executable instructions for implementing the operating system and modules, as well as any data used by these services. Additional stored data, as described below, can be stored in a data storage 316. During operation of the system 100, the operating system, the modules, and the related data may be retrieved from the non-volatile storage 312 or the data storage 316 and placed in the RAM 304 to facilitate execution.

In an embodiment, the second computing device 130 further includes a number of executable conceptual modules, including an interface module 318, an indexing module 320, a cryptography module 322, and a data module 324. In some cases, the modules 318, 220, 222, and 324 can be executed on the CPU 302. In further cases, some of the functions of the modules 318, 320, 322, and 324 can be executed on a server, on cloud computing resources, or other devices. In some cases, some or all of the functions of any of the modules 318, 320, 322, and 324 can be combined or run on other modules.

For confidential repository searching, the unencrypted data contents and their associative data can be first received in a trusted environment, such as at the input interface 306 or the network interface 310 of the second computing device 130. As part of the associative data, an index can be received or generated by the second computing device 130 and can include references to data contents; for example, files, and references to metadata attributes, of contents of the data repository.

In most cases, confidential search over an encrypted data repository can make use of a search database, which can be stored on the data storage 216 of the first computing device 120. The search database can be created at the time of adding content to the data repository. In most cases, the search database can be updated after each change in the repository in order to keep the confidential search operable when there are new changes to the encrypted data repository. Without such updates, it is possible that search results may not reflect the changes in the data repository.

In an example, the search database can include the encrypted data repository and the associative data can include, one or more of:

A list of encrypted metadata attributes associated with elements of stored data in the repository; for example, for each stored file in the repository. Such attributes may include encrypted versions of strings for attributes such as file name, file type, various dates associated with a file, comments about the contents of the file, and the like.

An encrypted index of searchable data contents in the repository; such as an index of plaintext searchable content or keywords.

In further cases, some parts of the associative data, such as some of the attributes and/or the index, can be unencrypted; such as for cases where some of the associated metadata is non-sensitive.

In some cases, confidential searching of the confidential repository can be evaluated to determine whether it satisfies various requirements, such as those related to correctness and to the possibility of scaling for various data sizes and queries. Additional requirements for evaluation can include efficiency of computation for performing the search operation, efficiency of computation for performing result retrieval, and efficiency of communication.

Figure 8:
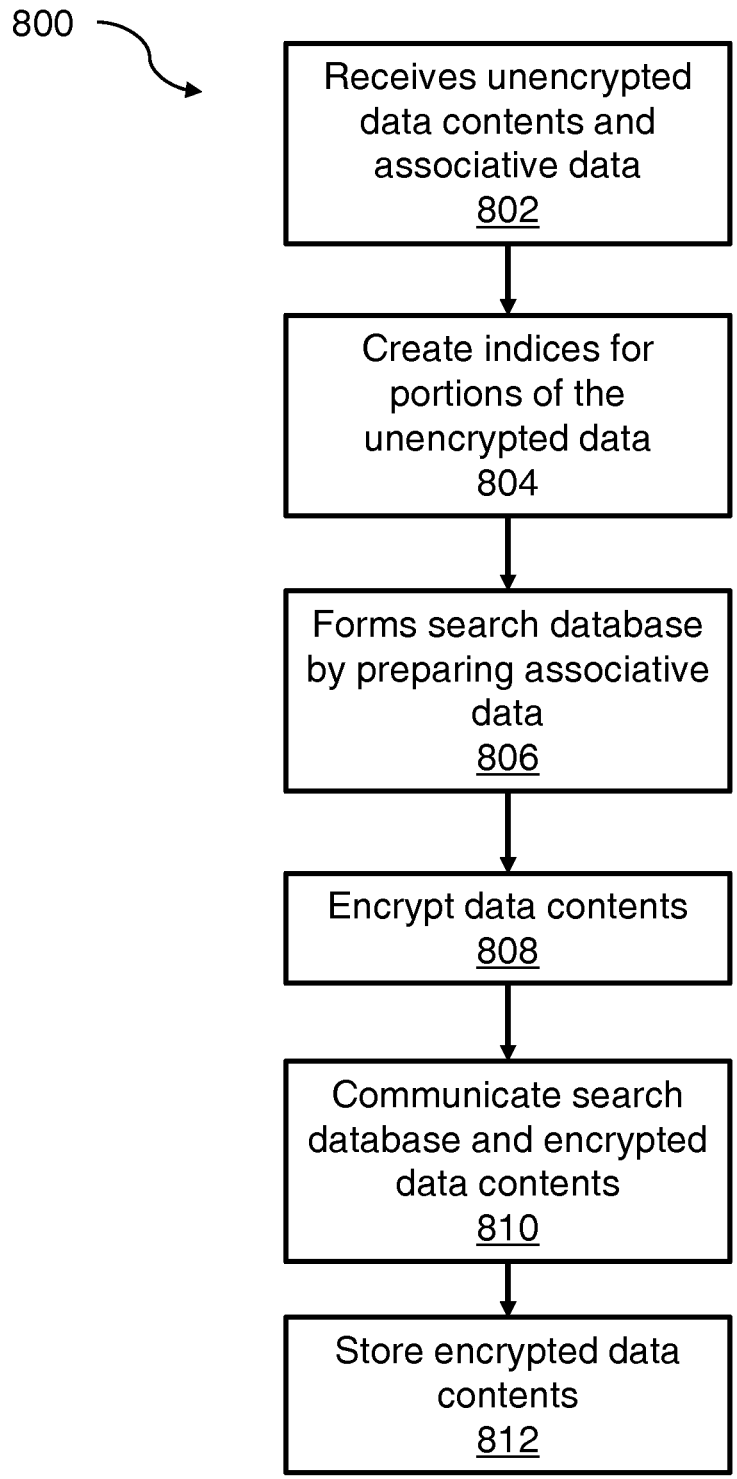
FIG. 8 illustrates a flowchart of a method for storing data contents in a confidential repository for confidential repository searching, in accordance with an embodiment.

FIG. 8 illustrates a flowchart of a method for storing data contents in a confidential repository for confidential repository searching 800, in accordance with an embodiment.

At block 802, the interface module 318 of the second computing device 130 receives unencrypted data contents and the associative data, for example, from the input interface 306 or the network interface 310 and stored in the data storage 316. In other cases, such unencrypted data can already be located in the data storage 316. In some cases, receiving the unencrypted data contents can include interaction with a trusted server or can include adding data contents, such as a set of files, to a locally executed client application associated with an encrypted data repository. The metadata attributes can include, for example, file names, file types, date attributes, geolocation attributes, confidential comments, and the like. In some cases, each metadata attribute can be marked as sensitive or not.

At block 804, in some cases, the indexing module 320 creates indices for portions of the unencrypted data content that is to be searchable. In some cases, the data content can be processed to generate an index of words used in each file of the data content. Other indexing approaches can be used as appropriate. The indexing module 320 can associate each index with its related data content (or file).

At block 806, the cryptography module 322 forms a search database by preparing the associative data. In some cases, such preparation can include preparing the associative data for subtraction searching. In some cases, such preparation can use a preconfigured HE schema, such as BFV to form the search database. However, it is appreciated that the selection of the type of searching operation and the type of the HE schema and the associated parameters may depend on the nature of data contents and various design choices.

In cases using subtraction searching, the objective of the subtraction search is to find all 'AND' query matches along with their locations in a homomorphically encrypted search database. A query ciphertext is sent to the search database for each term in the AND query corresponding to a specific column in the search database. In order to optimize the search operation, the HE subtraction search circuit can be reduced to only use the additive operations. As a result, the subtraction search can be performed using an optimized small HE encryption parameter set.

To prepare the search database for subtraction searching, each element in the database is hashed using a predetermined hash function H into |H| bits; for example into 64 bits. For each column in the database, an array of packed polynomials is created where each coefficient of each polynomial encodes a single hashed element in each column ensuring each coefficient represents one row of each column. As a result, a total of N/n polynomials are created for each column. In cases where |H|>|t|, each hash value can be partitioned into |t| bits and encoded into |H|/|t| polynomials, where each polynomial encodes only one partition of all the rows it includes. The number of polynomials included in a database prepared for subtraction searching is: N|H|/n|t|.

Figure 4:
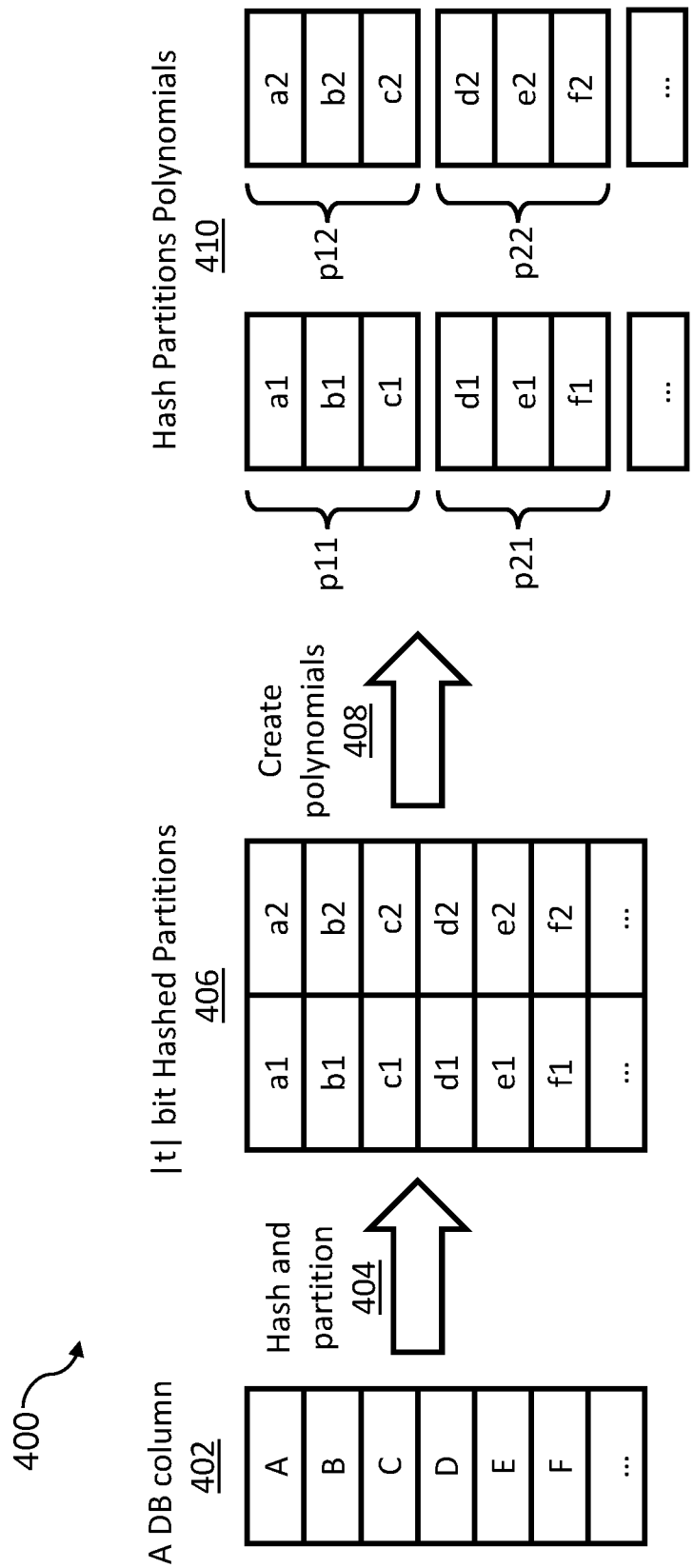
FIG. 4 is a diagrammatic example of database preparation for subtraction searching used in confidential repository searching.

FIG. 4 shows an example of database preparation 400 for confidential repository searching. A database column 402 is hashed 404 using H and partitioned into |t| bits to form |t| bit hashed partitions 406. Polynomials are then created 408 to form Hash Partition Polynomials 410. Example 400 shows elements A, B and C in database column 402 are hashed and partitioned into elements a1, a2, b1, b2, c1 and c2 to form polynomials p11 and p12.

At block 808, the cryptography module 322 encrypts the unencrypted data contents using any suitable encryption scheme; for example, using quantum-safe encryption approaches such as the Advanced Encryption Standard (AES). Generally, the encryption approach should provide suitable speeds for encryption and decryption operations and limit the expansion of data size where possible. Generally, the encryption scheme should be quantum-safe to ensure that the system 100 can pass industry standard security scrutiny for both classical and quantum threat models.

At block 810, the interface module 318 communicates the search database and the encrypted data contents to the second computing device via the network interface 310 over the network 110. In some cases, metadata that was marked as non-sensitive can also be communicated.

At block 812, the data module 324 stores the encrypted data contents in the data storage 316 for later use in processing of search queries.

Advantageously, the confidentiality of the confidential data repository encrypted by the second computing device 130 does not require trusting the execution environment of the first computing device 120. In some cases, the trusted environment can include or extend to all or some parts of the first computing device 120, constantly, or for a limited period of time. In such cases, the network interface 210, the data storage 216, the interface module 218, and the indexing module 220 can be respectively used instead of the network interface 310, the data storage 316, the interface module 318, and the indexing module 320 for the associated blocks of the method 800.

Figure 9A:
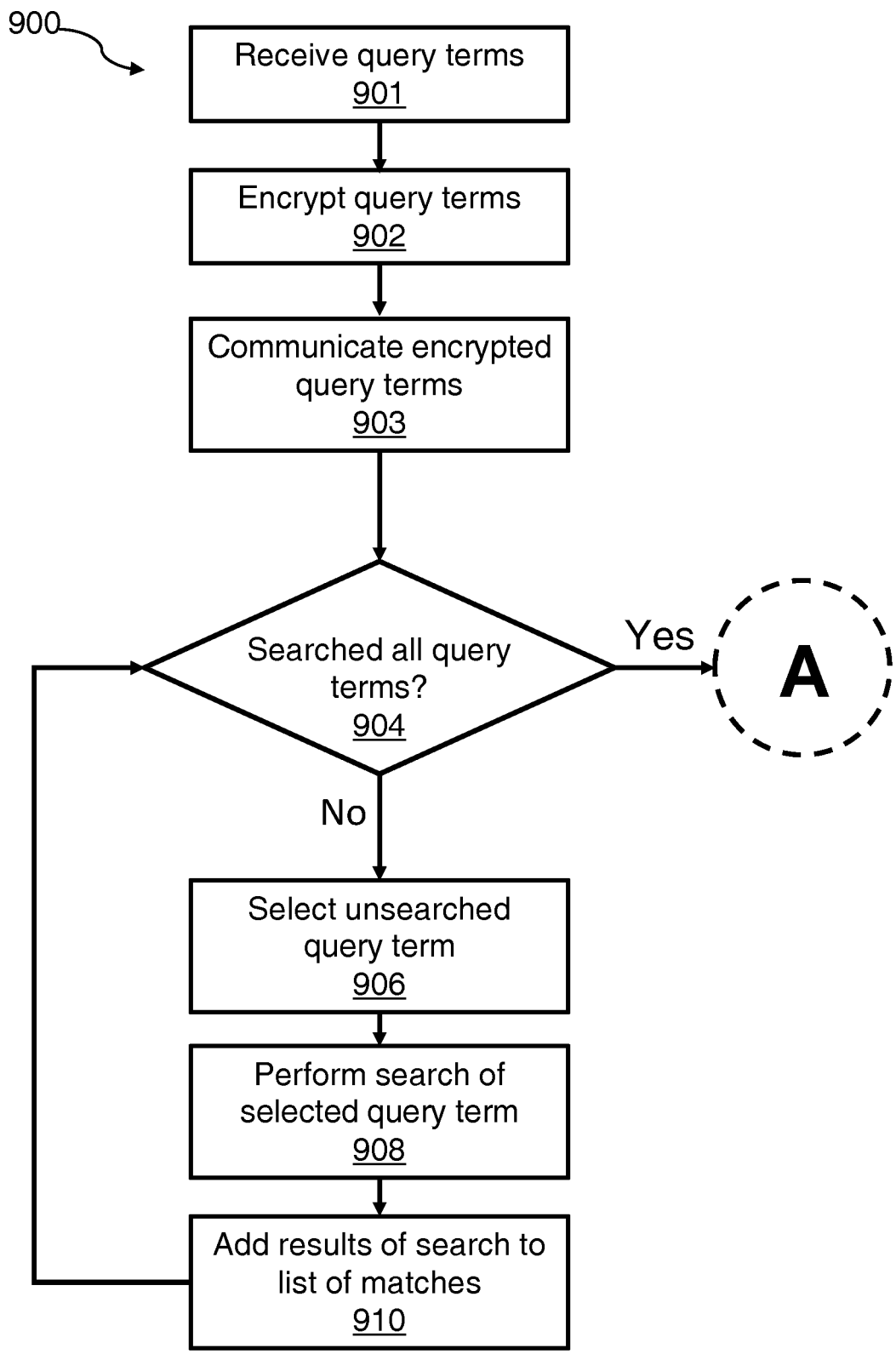
FIGS. 9A and 9B illustrate a flowchart diagram of a method for confidential repository searching with one or more a query terms.
Figure 9B:
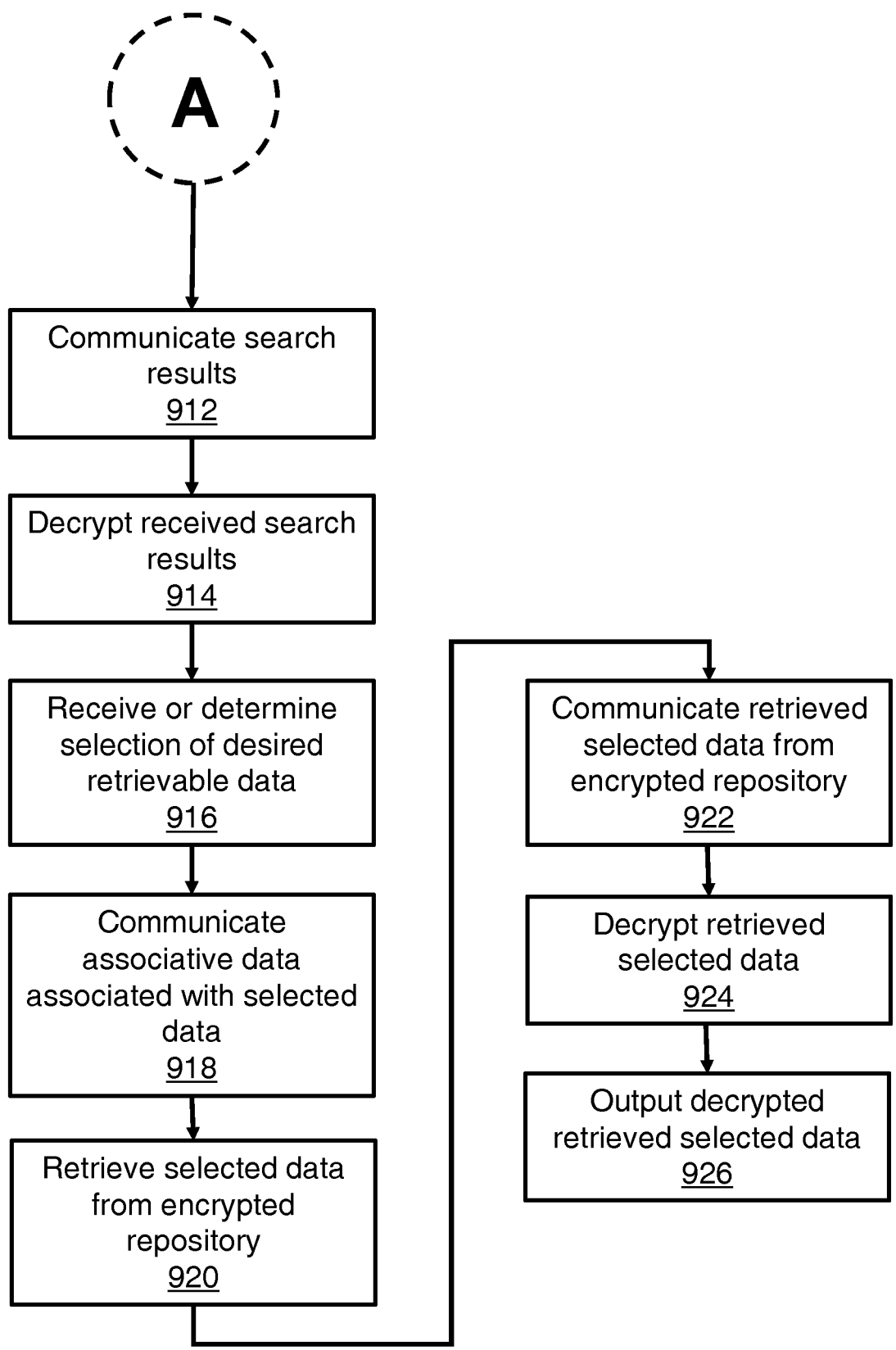

FIGS. 9A and 9B illustrate a flowchart diagram of a method for confidential repository searching with one or more query terms. At block 901, the interface module 318 of the second computing device 130 receives one or more query terms, such as from a user over the input interface 306, or retrieved via the network interface 310 or the data storage 316. Generally, this reception of the query terms operation can be performed in a trusted environment, such as the interface module 318 of the second computing device 130 to ensure confidentiality of the query is maintained and to ensure unencrypted query details are not disclosed to the execution host of the confidential repository searching operation.

At block 902, the cryptography module 222 encrypts each of the query terms using an encryption scheme, such as those described herein. To prepare a query for confidential repository searching, in some cases, an approach similar to the preparation of the database is applied on each query in the trusted environment. Each query term is hashed using the same hash function H into |H| bits. For each query term, a polynomial can be created, where all the coefficients of the polynomial encode the same hash value of the query term. In cases where |H|>|t|, each hash value can be partitioned into |t| bits and encoded into |H|/|t| polynomials, where each polynomial can include the same corresponding partition of the query term. Each one of the created polynomials can be encrypted to form a homomorphically encrypted ciphertext. The number of created partitioned query ciphertexts can be determined using: Number of query terms×|H|/|t|.

Figure 5:
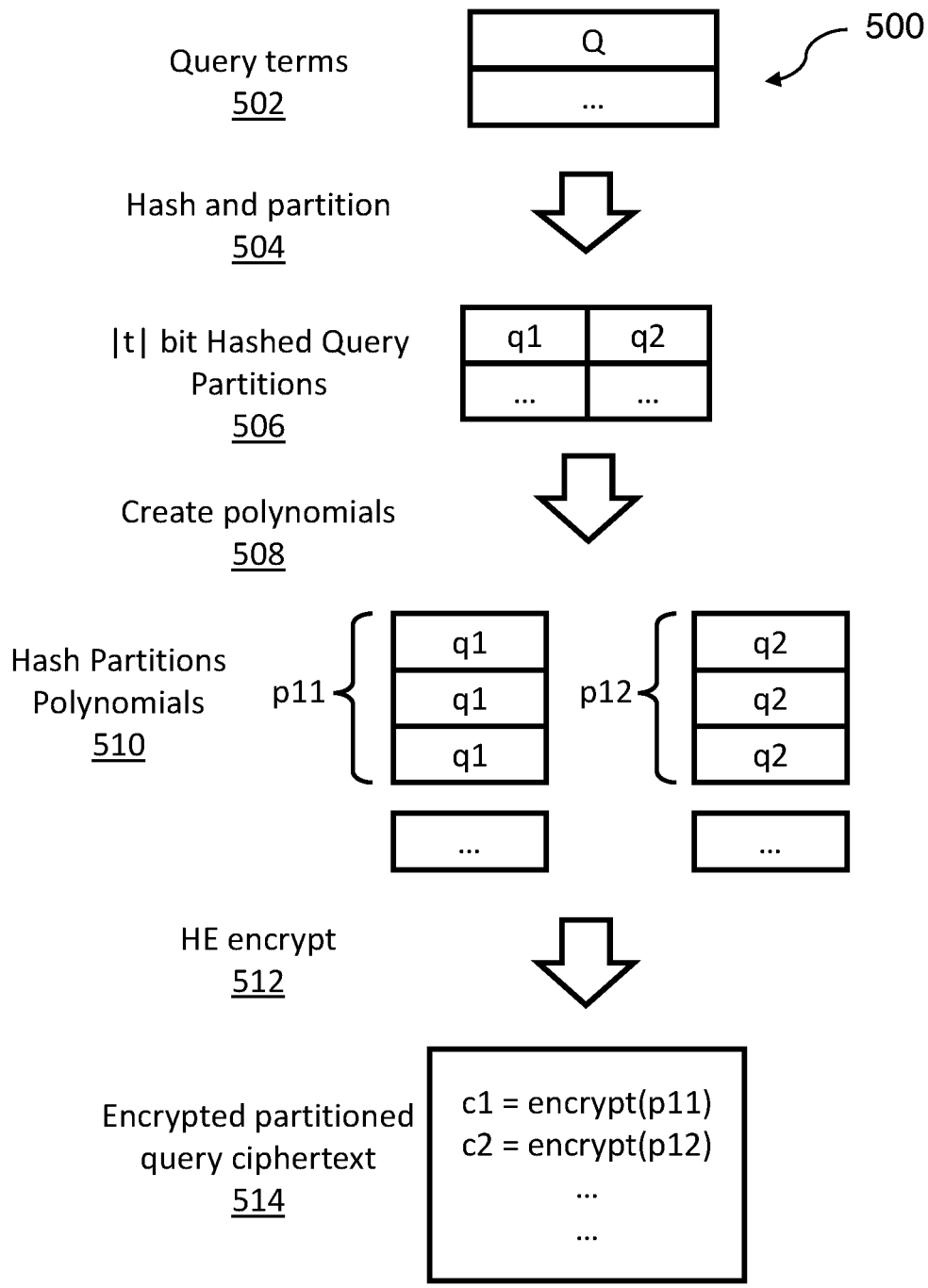
FIG. 5 is a diagrammatic example of query preparation for confidential repository searching.

FIG. 5 shows an example of the query preparation 500 for confidential repository searching. A column of query terms 502 is hashed using H and partitioned into |t| bits 504 to form |t| bit hashed query partitions 506. Hash partition polynomials 510 are then created 508. An HE encrypt function is performed 512 to create encrypted query cipher texts 514 from the hash partition polynomials 510. This example 500 shows and example query, Q, being hashed and partitioned into elements q1 and q2 to form polynomials p11 and p12, which are encrypted to form query cyphertexts c1 and c2.

At block 903, the interface module 318 of the second computing device 130 communicates the encrypted query terms to the interface module 218 of the first computing device 120 via the network interfaces 310, 210 over the network 110.

At blocks 904 to 910, in some cases where there are multiple query terms, a loop is performed on the first computing device 120; whereby each loop iteration performs a confidential repository search for a respective one of the encrypted query terms received from the second computing device 130. At block 904, the evaluation module 226 determines if all the query terms have been searched. If all query terms have been searched, the evaluation module 226 ends the loop.

At block 906, the evaluation module 226 selects one of the unsearched encrypted query terms for searching and prepares such term for searching. In order to match query terms to the repository, the variable-sized query terms can be hashed into fixed-bit-width words. The selection of this bit-width can ensure that two different queries do not hash to the same word, which would result in false positive matches in the search space. In a particular case, the selection of the bit-width, l, for any use-case, can generally use the following:

The error tolerance can be $p=2^{-t}$ as an acceptable probability of hash collision (false positives); and The number of unique keywords to be hashed, n, can be the sum of the total keywords in all the indices and the queries.

One way for avoiding false positives is setting the error tolerance to an extremely small value such as $p=2^{-20}$ or $p=2^{-40}$ to make collisions practically impossible. An example of minimum bit-width l for different sizes of keywords-to-be-hashed, n, in an index is listed in Table 1 for error tolerances of $p=2^{-20}$ and $p=2^{-40}$:

TABLE 1

| | bit-width, l | |
|---|---|---|
| unique keywords to be hashed, n | error tolerance $p = 2^{-20}$ | error tolerance $p = 2^{-40}$ |
| 10 thousand | 46 | 66 |
| 1 million | 59 | 79 |
| 10 million | 66 | 86 |
| 1 billion | 79 | 99 |
| 1 trillion+ | 99 | 119 |

For HE searching, the bit-width can only be selected from multiples of 32-bits. The bit-widths can be changed after initial indices and queries are created. The change of bit-width can apply to new indices and queries. Queries and processed indices with differing bit-widths are compatible and can co-exist in one confidential repository searching database, however, the false positive rate depends on the minimum bit-width in a confidential repository searching database. Generally, the higher the bit-width, the slower the performance for index processing and searching. The performance cost scales almost linearly with changes in the query bit-width but scales super-linearly with changes in the index processing bit-width. In other words, the performance is less sensitive to changes in index processing bit-width compared to changes in query bit-width.

At block 908, the evaluation module 226 searches the confidential repository for the selected query using the encrypted query ciphertext corresponding to such query term. In most cases, each query term can be searched only in its corresponding column of polynomials created in the search database, which was previously prepared.

For subtraction searching, in cases where $|H| \leq |t|$, each partitioned query ciphertext is subtracted from all polynomials in the corresponding column of the prepared repository-search database. Each subtraction, results in a result ciphertext, where each coefficient either encodes an encrypted 0 or an encrypted random value. A result of 0 indicates a match exists in the row corresponding to the matched coefficient. A random non-zero value is equal to the difference of the hash of the query and hash of the database element and indicates a mismatch. Each subtraction search for each hashed query cyphertext results in N/n ciphertexts.

For subtraction searching, in cases where $|H|>|t|$, each query term and each database element are partitioned. Each element in the corresponding column of the search database is split into multiple hash partitions encoded in coefficients of multiple polynomials. As a result, each hash partition of the query term is searched against corresponding partitions of the search database. The subtraction search is generally executed on a single partition of the hash values of the search database at a time; where each query ciphertext encodes a specific hash partition of the query and is subtracted from all polynomials encoding the corresponding hash partition in the search database. For each element, and all of its corresponding hash partitions, if the results of subtraction are zero, a match exists between the query and database element hashed to the same value; otherwise, the database element is a mismatch. After performing the subtraction search for all hash partitions, a total of $(N/n) \times (|H|/|t|)$ ciphertexts are produced for each hashed query cyphertext.

In some embodiments, the search operation can be performed under a multi-key HE scheme. A multi-key HE is a variant of HE schemes in which multiple entities, each with their own encryption keys, can collaborate using data encrypted under different keys. Multi-key HE allows a central party to perform HE operations on a data repository that was encrypted under the different keys. After performing an HE operation, the key owners must collaborate to issue an evaluation key. The evaluation key can be used by the centralized party to perform operations on the encrypted data. As a result, in cases where different data sources are encrypted under different secret keys, a multi-key HE scheme can be adopted to combine the different data sources and search and retrieve from the combination of the data sources. The result of a computation under a multi-key scheme can be decrypted using all the keys involved, or involving an authorized subset of the keys, such as a minimum number of the keys initially used to encrypt the data sources. The latter variant is known as threshold multi-key HE or threshold HE.

At block 910, the evaluation module 226 stores the results of the search for the selected query by adding the results to a list of matches stored on the data storage 216. In some cases, the execution of the confidential searching for query terms that have identical search scope can be executed in batches to optimize the execution time over several queries. In some cases, to process very large search databases more efficiently, the data module 224 can split up the database into multiple batches. Each batch can be treated as an independent database to be searched. This approach advantageously allows for parallelization of the different search batches on different threads or different systems.

In some cases, with the splitting operation, each evaluation can be performed on each split separately. As a result, a high-level optimization can be performed by running evaluations for each split in parallel. As evidenced by exemplary experiments conducted by the present inventors, implementations of the parallelization can dramatically decrease execution time.

After the cessation of the loop, at block 912, the interface module 218 of the first computing device 120 communicates the search results, such as the list of all matches, to the interface module 318 of the second computing device 130 via the network interfaces 310, 210 over the network 110.

At block 914, the cryptography module 322 decrypts the received search results using the cryptography module 322. Advantageously, in many cases, the second computing device 130 can be the only entity that possesses the decryption keys to evaluate the search results.

At block 916, the interface module 318 receives a selection of the desired retrievable data from the decrypted search results; for example, via a user over the input interface 306. However, in further cases, such selection can be automatically selected using any suitable matching scheme.

At block 918, the interface module 318 communicates the associative data representing the selected search result to the interface module 218 of the first computing device. At block 920, the data module 224 retrieves the selected data from the encrypted data repository using the received associative data. In some cases, communication and retrieval of the selected data identified from subtraction searching (i.e., matched records) can include performing a computational variant of private information retrieval (CPIR). Variants of PIR, including CPIR, allows confidential retrieval of matched records from the repository database without making it possible for other devices to learn which records were retrieved. In some cases, HE encryption can be used to ensure privacy and scalability of queries to allow single record retrieval and multiple record retrieval. In some cases, CIPR can be based on a model supporting compressed queries and amortized query processing based on a ring variant of learning with errors (RLWE).

Since operations in HE ciphertext space are computationally more expensive than plaintext space, another optimization of PIR can be achieved by postponing some operations in the expansion of the encrypted polynomial and performing them after decrypting the resulting polynomial to reduce execution time. Since multiple matched records may have been identified, the retrieval of multiple records from the repository database using PIR can be performed. This can be achieved by breaking the repository database into smaller buckets, treating each bucket as a separate database, and performing a single record retrieval PIR on each bucket.

For each use of PIR, the data module 224 is able to retrieve the selected data from the encrypted data repository. This is achieved by representing the retrieval query using an encrypted polynomial. In this polynomial, for example, the index of the record to retrieve, i, is encoded by making i-th coefficient 1, and all other coefficients 0. In some cases, the data module 224 can expand this encrypted polynomial into several encrypted polynomials, equal to the number of records in database to create a set of encrypted mask polynomials; where in each polynomial, the i-th coefficient encodes a 1, and other coefficients encode 0. The encrypted mask polynomials are multiplied by the plaintext representation of the respective record from the database. As a result, it is ensured that only one of the resulting polynomials contains the requested record data. The resulting polynomials can be added together and decrypted to obtain the record itself.

To retrieve multiple records using PIR, similar to single record retrieval, each bucket of the repository database is queried separately. Advantageously, the strategy used in the multi-record retrieval PIR results in a lower number of operations per each single record retrieval PIR for each bucket, resulting in significantly faster performance compared to naively issuing a single record retrieval PIR for each matched record on the entire database. Furthermore, similar to the single record retrieval PIR, the first computing device 120 cannot generally learn which records are retrieved, and hence, privacy is preserved.

A naive approach to breaking the repository database into several buckets and performing a single-retrieval PIR on each single bucket can impose a practical computation and communication overhead because the record to be retrieved is not assured to be in each queried bucket. In some cases, cuckoo hashing can be utilized to distribute matches across the buckets, to ensure each record in the database is placed into h out of k buckets, using h hash functions by hashing the index of the record. The multi-record retrieval query can be performed by hashing each record index into k slots (where only one index can occupy a slot) using cuckoo hashing using h hash functions. The resulting k slots can then be transformed into k single-retrieval PIRs, where each jth slot is used for a single record retrieval PIR to the jth bucket.

Similar to the determination of matches, parameters of the HE scheme can affect multi-record retrieval PIR, which itself includes single-record retrieval PIR and its parameters. For parameters of the HE scheme, due to potentially requiring ciphertext-plaintext multiplication, multiple consecutive ciphertext addition, and ciphertext expansion, the combination of (a) the size of each record in the search database, and (b) the overall size of each record, can impose a direct limit on the selection of modulus t and an indirect effect on selection of modulus q. In selection of the HE scheme parameters, the HE noise budget may suffer from lowering n and q parameters. In many cases, the selected parameters should also be chosen to provide 128-bit security in both classical and quantum threat models. In example experimental implementations performed by the present inventors, using BFV scheme and 10 millions of 256 byte records in a sample search database, a polynomial degree of $n=2048$, a ciphertext modulus bit width of $q=50$ or $q=51$, a plaintext modulus bit width of $t=10$, and a ciphertext size of 32 KB were selected after experimenting various parameter sets. These selections were made to balance the effect of the above parameters and pass 128-bit security in both classical and quantum threat models. With such parameters, noise levels never grew enough to overflow and destroy ciphertext message.

For selection of parameters of PIR, including both multi-record retrieval PIR and single-record retrieval PIR, the number of buckets b is determined based on cuckoo hashing fill rate expectations and can be defined as a multiplication of the number of records to retrieve per transaction, k. Generally, increasing k reduces the time required per query, however, since the number of buckets are related to k, increasing k has an undesirable effect of increases in the size of query and results. In some cases, where the number of records to fetch is expected to change dramatically, instead of a pre-determined value for k, the confidential repository searching can use a dynamic value to reduce undesirable effects of unnecessarily high values in every query. In example experimental implementations performed by the present inventors, the increases of k was found to leave an almost linear reduction in the time required per query. In these example experiments, after experimenting with various parameter sets, in addition to the parameters of HE scheme, the following parameters were used to balance the above effects: dimensions of buckets $d=2$, number of records to retrieve, $k=16$ or 64 or 256 or 512, number of hash function $h=3$, and number of buckets $b=1.5 \times k$.

At block 922, the interface module 218 communicates the retrieved data from the encrypted data repository to the interface module 318 of the second computing device 130.

At block 924 the cryptography module 322 decrypts the encrypted data retrieved from the encrypted data repository. At block 926, the interface module 318 outputs the decrypted retrieved data to the user via the output interface 308, to other system via the network interface 310, and/or to storage on the data storage 316.

Figure 6:
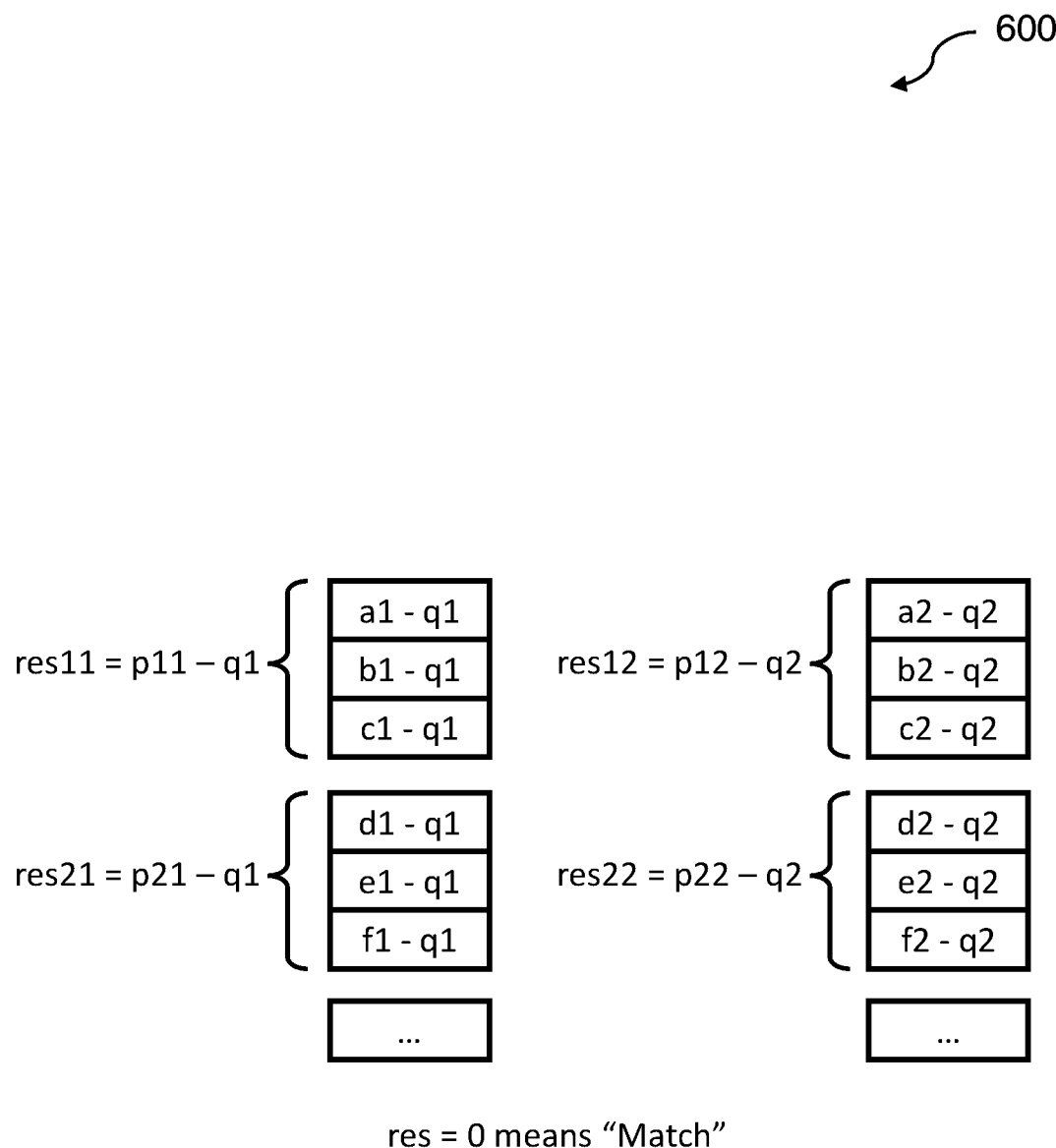
FIG. 6 is a diagrammatic example of query subtraction searching using compression for the examples of FIGS. 4 and 5.

FIG. 6 illustrates an example of query subtraction searching using compression 600 for confidential repository searching. The search involves two query partitions of q1 and q2 and two |t| bit hashed partition columns of a search database column. The hashed partitions include two corresponding partitions for each element of the search database, similar to the example of FIG. 4. In cases where |H|>|t|, the results can be compressed over hash partitions for each element to produce N/n ciphertexts instead of (N/n)×(|H|/|t|). To perform the compression, for each row of the search database, the subtraction search results of each hash partition ciphertexts for the same row are added together. This operation preserves the results because, if all the hash partitions are zero, then their sum must also be zero. This compression operation reduces the number of ciphertexts by a factor of |H|/|t|; thereby producing the same number of ciphertexts as the cases where |H|≤|t|. Since the compression operation is performed using a modular addition operation with a modulus t, if the sum of the hash partitions is equal to t or a multiple of the t, the result of the compression would equate to zero in the modular result; which may be incorrectly interpreted as a match. However, the likelihood of such incorrect interpretation is extremely small because the probability of compression false positives is $2^{-t}$; for example, for a 32 bits plaintext modulus, the probability of false positive matches as a result of compression of search results is $2^{-32}$.

Figure 7:
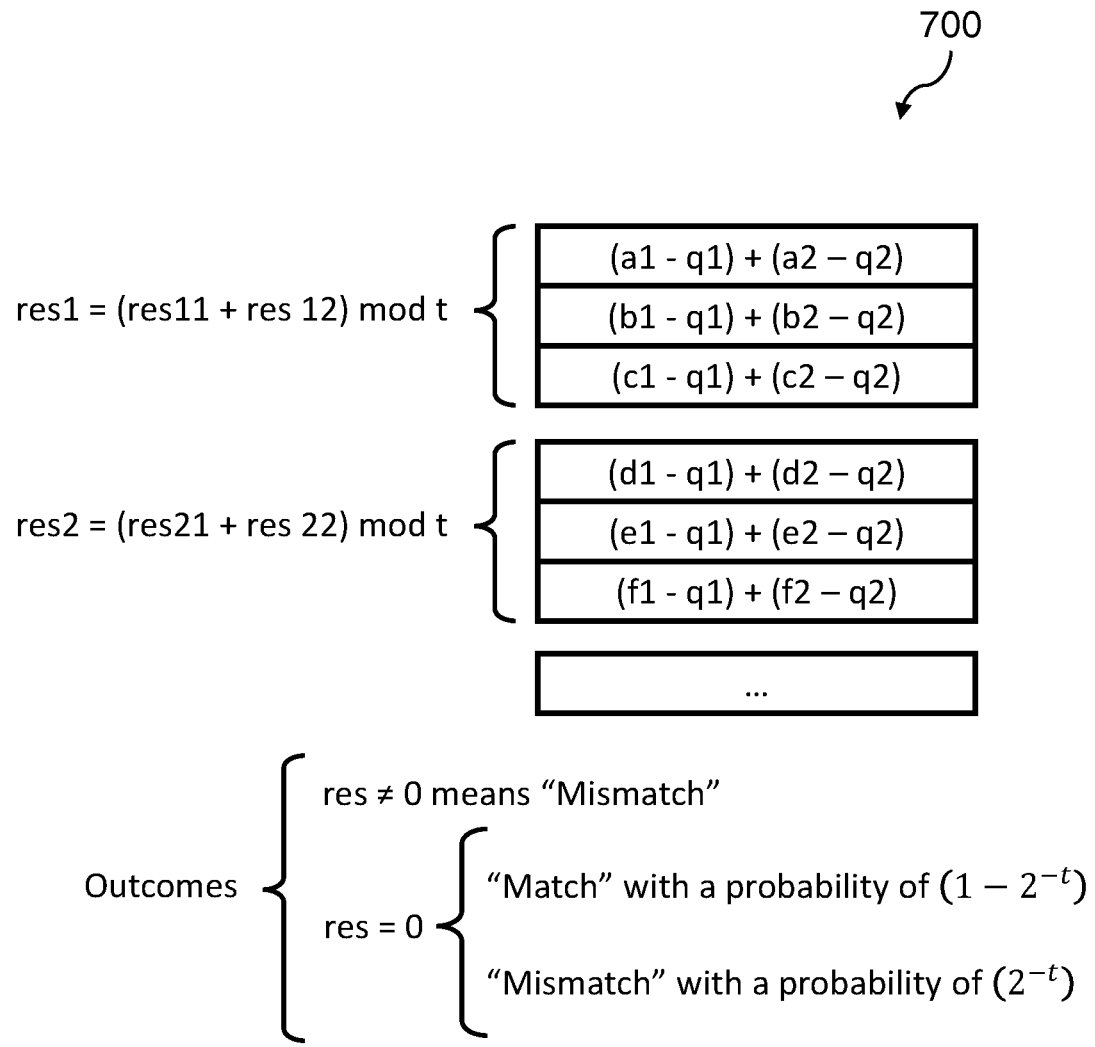
FIG. 7 is a diagrammatic example of result compression for the example provided in FIG. 6.

FIG. 7 shows an example of result compression 700 for the example database from FIG. 4 and the example query from FIG. 5. For each row of the search database, each |t| bit hashed query partition is subtracted from it's corresponding |t| bit hashed search database column partition to determine a result for each partition. The partitioned results for each row are summed to form a set of compressed results.

The parameters used for the HE scheme can have a direct effect on computation costs of the subtraction searching and the overall communication costs. Generally, reducing n and q, reduces the expansion of ciphertexts and makes HE operations faster. For example, in a BFV encryption scheme, unlike the HE operations and cyphertext expansion, an HE noise budget will suffer from lowering n and q parameters. However, since in a subtraction search, the arithmetic circuits of HE operations generally only rely on additive operations, the effects of lowering n and q are advantageously not substantial. Also, the size of plaintext modulus t significantly affects the rate of false positives results, where a higher value of t results in a lower probability of false positives; effectively prejudicing selection of higher values for t. In example experimental implementations performed by the present inventors, using various parameter sets and a BFV scheme, to balance the effect of t and ciphertext size, a polynomial degree of n=2048, a ciphertext modulus bit width of q=51, a plaintext modulus bit width of t=33, and a ciphertext size of 32 KB were selected. These values were determined to effectively balance the effect of t and ciphertext size. With such parameters, noise levels never grew enough to overflow and destroy the ciphertext message.

While the present embodiments generally describe using subtraction searching to determine if there are matches in the confidential search database, it is understood that any suitable confidential searching under HE scheme can be used; for example, Labeled PSI and Bit Decompose Search.

While the present embodiments generally refer to encryption keys, encryption/decryption key pairs, and multi-key HE, it is understood that any suitable encryption scheme can be used; for example, Identity Based Encryption.

In some cases, parallelization, multi-threading, GPU computing, and pipelining techniques can be used to benefit the confidential repository searching. These techniques can be used to accelerate and schedule various aspects of the confidential repository searching; for example, the polynomial interpolation and HE operations. In some cases, parallelization and/or pipelining may not be performed, and in such cases, execution time may increase. However, it can allow the searching to be run on a wider variety of devices; for example, on platforms that have limited processing capabilities (e.g., internet-of-things, embedded, and mobile processors).

Advantageously, character-level string comparison may also be excluded if virtual uniqueness is satisfied and the level of false positives received is tolerable for an intended application. The exclusion of character-level string comparison also allows for a parallel implementation in hardware as data does not need to be revisited.

In some cases, some aspects of the confidential repository searching can be partially executed to allow optimized utilization of all resources. In some cases, a paginating and/or streaming approach can be used; for example. Significant improvements can be achieved by pagination of blocks 914 to 920.

In some cases, for example where the components of the first computing device 120 or the second computing device 130 are distributed among two or more locally and/or remotely distributed computer systems, additional downstream analytics can be performed on the encrypted data.

In some cases, machine learning models, such as those implementing regression analysis, can be used to identify suitable keywords or metadata in relation to data sources. Additionally, the associative data, whether some or all is HE encrypted or unencrypted, can also be used as input to machine learning models to extract various machine learning insights or to generate inferences about all or portions of the data set. Analytics can also be used to identify clusters and snippets of a cluster of data. The results of the machine learning operations, or other analytics, can be used as at least a portion of the associative data in the system 100. In some cases, the results of the machine learning operations or other analytics, when performed under HE, can be private until decrypted by the holder of the secret key.

Although the invention has been described with reference to certain specific embodiments, various modifications thereof will be apparent to those skilled in the art without departing from the spirit and scope of the invention as outlined in the claims appended hereto.

The invention claimed is:

1. A method for confidential repository searching, the method executed on at least one processing unit of a first computing device, the first computing device having received an encrypted data repository from a second computing device, the method comprising:
  receiving an encrypted query term from the second computing device;
  searching the encrypted data repository by determining one or more matches of the encrypted query term to data in the encrypted data repository, wherein searching the encrypted data repository comprises performing subtraction searching, wherein each element in the encrypted data repository has been hashed using a predetermined hash function, and wherein, for each column in the data repository, an array of packed polynomials is created where each coefficient of each polynomial encodes a single hashed element in each column;

communicating the one or more matches to the second computing device;

receiving associative data from the second computing device, the associative data associated with encrypted data in the encrypted data repository that is to be retrieved and associated with one of the one or more matches;

retrieving the encrypted data in the encrypted data repository associated with the received associative data; and communicating the retrieved encrypted data to the second computing device.

2. The method of claim 1, wherein retrieving the encrypted data in the encrypted data repository associated with the received associative data comprises using private information retrieval (PIR).

3. The method of claim 1, wherein the second computing device hashes and partitions the query term to generate hash partition polynomials, wherein each one of the polynomials is encrypted to form a homomorphically encrypted ciphertext, and wherein the homomorphically encrypted ciphertext comprises the encrypted query term.

4. The method of claim 3, wherein searching the encrypted data repository comprises subtracting each partitioned query ciphertext from polynomials in a corresponding column of the encrypted data repository, and wherein a subtraction result of 0 indicates a match.

5. The method of claim 4, wherein, for each row of the encrypted data repository, the subtraction results of each hash partition ciphertexts for the same row are added together.

6. The method of 1, wherein each polynomial in the encrypted data repository encodes only one partition of rows that such polynomial includes.

7. The method of 1, wherein searching the encrypted data repository comprises searching only in a column of polynomials of the search database associated with the encrypted query term.

8. The method of claim 1, wherein the associative data comprises an index that is encoded using an encrypted polynomial where the index, i, is encoded by making an i-th coefficient 1, and all other coefficients 0.

9. The method of claim 1, wherein the associative data comprises an index that is encoded using multiple encrypted polynomials, the number of encrypted polynomials equal to a number of terms in the encrypted data repository, and wherein the i-th polynomial encodes a 1 and other polynomials encode a 0.

10. A system for confidential repository searching, the system comprises at least one processing unit and a data storage media in communication with the at least one processing unit, the at least one processing unit and the data storage media part of a first computing device, the first computing device having received an encrypted data repository from a second computing device, the at least one processing unit configured to execute:

an interface module to receive an encrypted query term from the second computing device;

an evaluation module to search the encrypted data repository by determining one or more matches of the encrypted query term to data in the encrypted data repository, wherein searching the encrypted data repository comprises performing subtraction searching, wherein each element in the encrypted data repository has been hashed using a predetermined hash function, and wherein, for each column in the data repository, an array of packed polynomials is created where each coefficient of each polynomial encodes a single hashed element in each column, wherein the interface module communicates the one or more matches to the second computing device and receives associative data from the second computing device, the associative data associated with encrypted data in the encrypted data repository that is to be retrieved and associated with one of the one or more matches; and a data module to retrieve the encrypted data in the encrypted data repository associated with the received associative data, wherein the interface module communicates the retrieved encrypted data to the second computing device.

11. The system of claim 10, wherein retrieving the encrypted data in the encrypted data repository associated with the received associative data comprises using private information retrieval (PIR).

12. The system of claim 10, wherein the second computing device hashes and partitions the query term to generate hash partition polynomials, wherein each one of the polynomials is encrypted to form a homomorphically encrypted ciphertext, and wherein the homomorphically encrypted ciphertext comprises the encrypted query term.

13. The system of claim 12, wherein searching the encrypted data repository comprises subtracting each partitioned query ciphertext from polynomials in a corresponding column of the encrypted data repository, and wherein a subtraction result of 0 indicates a match.

14. The system of claim 13, wherein, for each row of the encrypted data repository, the subtraction results of each hash partition ciphertexts for the same row are added together.

15. The system of 10, wherein each polynomial in the encrypted data repository encodes only one partition of rows that such polynomial includes.

16. The system of 10, wherein searching the encrypted data repository comprises searching only in a column of polynomials of the search database associated with the encrypted query term.

17. The system of claim 10, wherein the associative data comprises an index that is encoded using an encrypted polynomial where the index, i, is encoded by making an i-th coefficient 1, and all other coefficients 0.

18. The system of claim 10, wherein the associative data comprises an index that is encoded using multiple encrypted polynomials, the number of encrypted polynomials equal to a number of terms in the encrypted data repository, and wherein the i-th polynomial encodes a 1 and other polynomials encode a 0.

19. A method for confidential repository searching, the method executed on at least one processing unit of a second computing device, the second computing device having communicated an encrypted data repository to a first computing device, the method comprising:

receiving a query term to be searched on the encrypted data repository;

encrypting the query term;

communicating the encrypted query term to the first computing device to be searched against the encrypted data repository by determining one or more matches of the encrypted query term to data in the encrypted data repository, wherein searching the encrypted data repository comprises performing subtraction searching, wherein each element in the encrypted data repository has been hashed using a predetermined hash function, and wherein, for each column in the data repository, an array of packed polynomials is created where each coefficient of each polynomial encodes a single hashed element in each column;

receiving the one or more matches to the second computing device;

decrypting the one or more matches;

receiving associative data associated with the one of the one or more matches that is to be retrieved from the encrypted data repository;

encrypting the associative data;

communicating the encrypted associative data to the second computing device, the encrypted data in the encrypted data repository is retrievable with the received encrypted associative data;

receiving the retrieved encrypted data from the second computing device;

decrypting the retrieved encrypted data; and outputting the decrypted retrieved data.

* * * * *